(12) United States Patent
Zhilinsky et al.

(10) Patent No.: US 9,938,752 B2
(45) Date of Patent: Apr. 10, 2018

(54) ELECTRONIC DEVICE SEALING ARRANGEMENT AND METHOD

(71) Applicant: Sensors Unlimited, Inc., Princeton, NJ (US)

(72) Inventors: Dmitry Zhilinsky, Richboro, PA (US); Leonardo C. Gonzales, Dresher, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/261,144

(22) Filed: Sep. 9, 2016

(65) Prior Publication Data

US 2018/0073276 A1 Mar. 15, 2018

(51) Int. Cl.
| | |
|---|---|
| *H04N 5/225* | (2006.01) |
| *E05B 65/00* | (2006.01) |
| *F16J 15/02* | (2006.01) |
| *E05B 65/06* | (2006.01) |
| *E05C 3/12* | (2006.01) |
| *E05B 15/00* | (2006.01) |
| *E06B 7/16* | (2006.01) |

(52) U.S. Cl.
CPC ........ *E05B 65/001* (2013.01); *E05B 15/0053* (2013.01); *E05B 65/06* (2013.01); *E05C 3/124* (2013.01); *E06B 7/16* (2013.01); *F16J 15/021* (2013.01); *H04N 5/2252* (2013.01)

(58) Field of Classification Search
None
See application file for complete search history.

(56) References Cited

U.S. PATENT DOCUMENTS

| | | |
|---|---|---|
| 4,194,100 A | 3/1980 | Cox et al. |
| 8,376,418 B2 | 2/2013 | Osvatic et al. |
| 8,403,298 B2 | 3/2013 | Nguyen |
| 8,855,527 B2 | 10/2014 | Pingel et al. |
| 2004/0157071 A1* | 8/2004 | Nugue .............. B32B 17/10036 428/500 |
| 2015/0022717 A1* | 1/2015 | Coons .................... E05C 19/14 348/373 |

* cited by examiner

*Primary Examiner* — Stephen Coleman
(74) *Attorney, Agent, or Firm* — Locke Lord LLP; Scott D. Wofsy; Christopher J. Cillié

(57) ABSTRACT

An electronic device sealing arrangement includes a housing, an access door, a sealing member sized and configured to be sealingly compressed between the access door and the housing, a latch in operable communication with the housing and the access door, the latch being configured to compress the sealing member between the access door and the housing when moved to a position that latches the access door in a closed position, and a resilient member in operable communication with the latch and at least one of the housing and the access door, the resilient member being configured to at least partially compress when the access door is latched in the closed position and the sealing member is compressed between the access door and the housing.

16 Claims, 4 Drawing Sheets

ELECTRONIC DEVICE SEALING ARRANGEMENT AND METHOD

FIELD

Embodiments of the invention relate to waterproof and/or water resistant electronic housing, and more particularly, to user access port seals.

BACKGROUND

As the popularity of electronics such as cameras and computing devices increases, demand for water proof/resistant compact electronics also increases. However, to create a water proof/resistant camera housing, there needs to be a way to reliably seal user access ports, e.g., battery, input/output (I/O), or memory card access compartments. Certain conventional systems use a small o-ring around the access port opening, which is a simple and cost effective way to achieve water resistance. However, these systems can be problematic as the allowed seal compression is very small, which requires tight tolerances or special assembly steps to latch the compartment properly and provide consistent user feedback.

Such conventional methods and systems have generally been considered satisfactory for their intended purpose. However, there is still a need in the art for improved sealing of access ports of electronic devices. There is also a need for such systems that are easy to make and use. The present disclosure provides a solution for these problems.

SUMMARY

An electronic device sealing arrangement includes a housing, an access door, a sealing member sized and configured to be sealingly compressed between the access door and the housing, a latch in operable communication with the housing and the access door, the latch being configured to compress the sealing member between the access door and the housing when moved to a position that latches the access door in a closed position, and a resilient member in operable communication with the latch and at least one of the housing and the access door, the resilient member being configured to at least partially compress when the access door is latched in the closed position and the sealing member is compressed between the access door and the housing.

The latch can include a bore configured for receiving a hinge pin, the latch member being configured to pivot about the hinge pin. The resilient member can be configured adjacent to the bore to accommodate lateral movement of the hinge pin in the bore. The latch can include an arm portion configured to slidably engage a groove on the electronic device to toggle the access door between a locked position and an unlocked position. In the locked position, the resilient member can relieve the overall compression on the sealing member of the access door in a closed position.

The arm portion can be disengaged from the groove in the unlocked position. The arm portion can be engaged with the groove in the locked position. The sealing member can form a face seal between a surface on an access area and the access door upon closing of the access door.

The resilient member can be configured to deflect laterally upon closing of the latch. Deflection of the resilient member can increase an amount of allowable lateral movement of the latch.

The resilient member can include a compressible material. The resilient member can include a polymeric insert. The polymeric insert can be selected to match an overall compression of the sealing member. Compressibility of the polymeric insert can be inversely related to compressibility of the sealing member.

The access area can include one of a battery compartment, a memory access compartment and an input/output compartment. The electronic device can include a camera.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
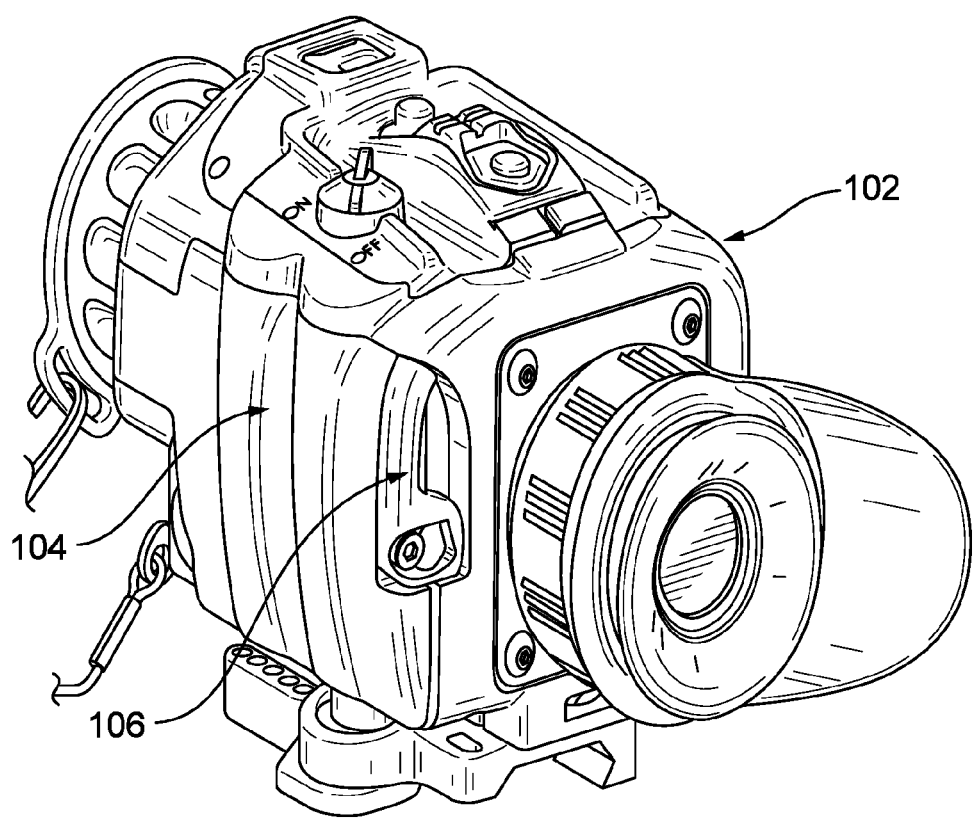
FIG. 1 is a perspective view of an environmentally sealed electronic device having a sealed enclosure, according to an exemplary embodiment in accordance with this disclosure.

Reference will now be made to the drawings wherein like reference numerals identify similar structural features or aspects of the subject disclosure. For purposes of explanation and illustration, and not limitation, a partial view of an exemplary embodiment of the electronic device with a latch assembly in accordance with the disclosure is shown in FIG. 1 and is designated generally by reference character 100. Other embodiments of the electronic device in accordance with the disclosure, or aspects thereof, are provided in FIGS. 2-4B, as will be described.

For various electronic devices, it is desirable to create a waterproof/water resistant seal system. One method to create a waterproof/water resistant seal is to create a seal at the interface where the battery goes in, which is usually shared with a data port (e.g., micro SD card, USB). A seal can be created with an o-ring seated around the perimeter of a user access door (e.g., access door to the battery compartment). Typically, the access door includes a latch that rotates around a fixed hinge and does not have any movement perpendicular to the axis of the hinge. Therefore, when the door latch is closed, the compression exerted on the o-ring in a face seal configuration has to fall within a very small acceptable window. The o-ring face seal may be impractical in this configuration due to tight tolerances required and high variability in user feel for the closing latch.

As used herein, tolerance refers to the mechanical tolerance of the entire mechanical assembly and/or parts of the mechanical assembly. For example, the o-ring is part of the door assembly, and the door has variable thickness due to manufacturing tolerances. The electronic device housing, e.g., camera housing, can also have variable thickness due to manufacturing tolerances. The door position relative to the camera where the hinge pin is located also has manufacturing tolerances.

Embodiments herein integrate a compressible polymer into the door latch opening to create an additional deflection point that can allow for looser tolerances since it effectively doubles the amount of allowable movement. This allows for the use of looser tolerances and eliminates any special fixture required.

Referring to the figures, FIG. 1 shows an exemplary embodiment of an environmentally sealed electronic device 100. The environmentally sealed electronic device 100 includes enclosure 102 (e.g., camera housing), with a sealed user access door 104 that can be opened and closed by rotating closing latch 106. The electronic device 100 may be a camera, a video recording device, or other electronic devices having a user access door that would benefit from waterproof sealing.

Figure 2:
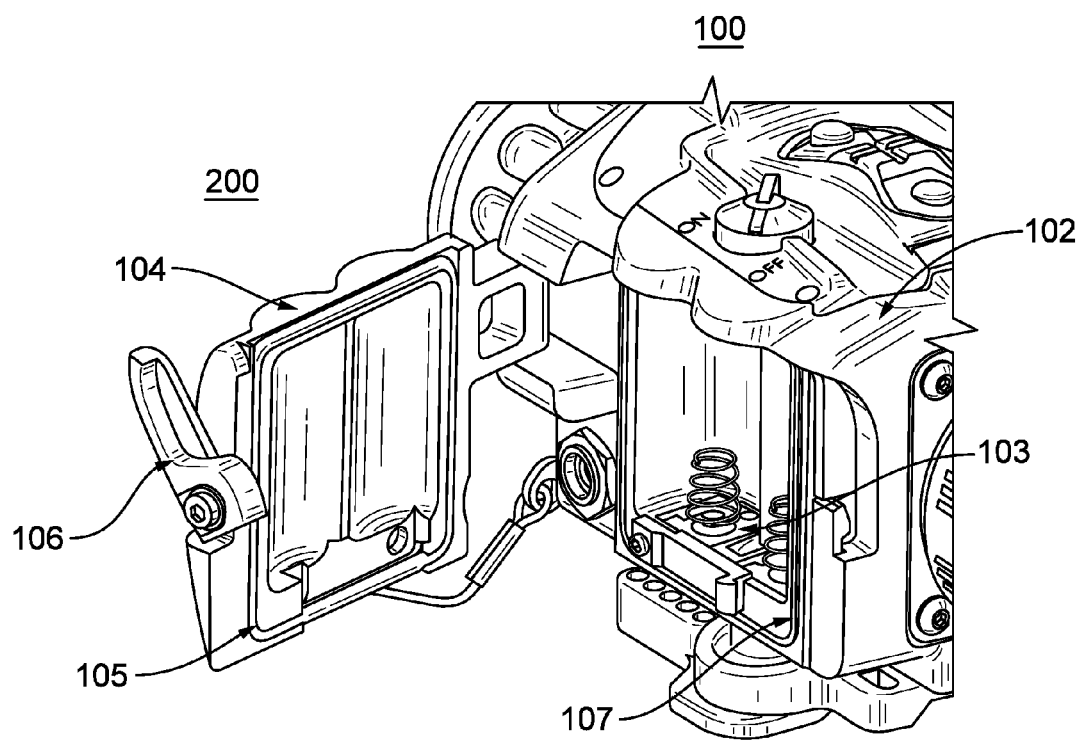
FIG. 2 is a perspective view of the environmentally sealed electronic device of FIG. 1, showing the access door in an open position.

FIG. 2 shows the door assembly 200 of electronic device 100 with the access door 104 in the open position. As shown, a compressible sealing member, e.g., an o-ring, 105 is integrated into the sealed user access door 104. O-ring 105 provides a seal between face seal surface 107 on the user access area 103 and the sealed user access door 104 when the user access door 104 is in the closed position. The user access area 103 may be a battery compartment, an I/O compartment, or memory card access compartment. As shown, the o-ring 105 is arranged in a face seal configuration with respect to the face seal surface 107.

Figure 3:
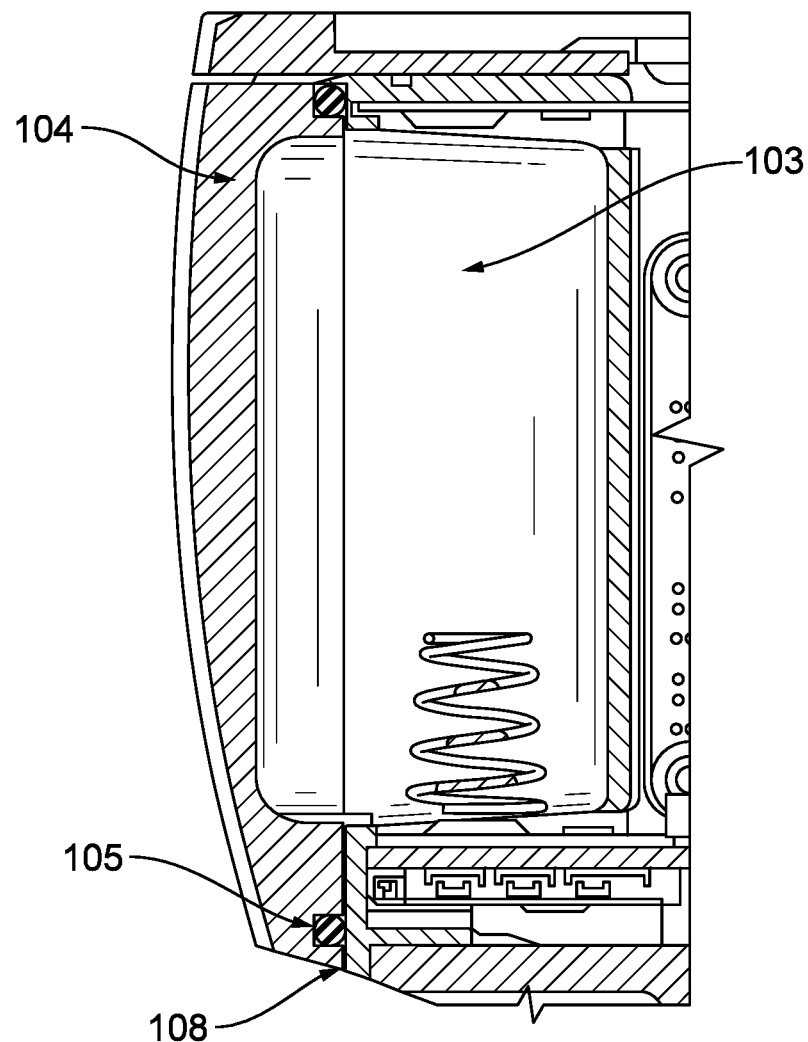
FIG. 3 is a cross-sectional elevation view of a portion of the electronic device of FIG. 1, showing the access door in the closed position.

FIG. 3 shows the user access door 104 in a closed position. Tolerance gap 108 between the user access door 104 and user access area 103 has to be closely controlled. Too much compression will cause compression set on the o-ring 105 and will reduce sealing effectiveness and make the user access door 104 too difficult to close; whereas, too little compression may result in seal leakage.

Figure 4A:
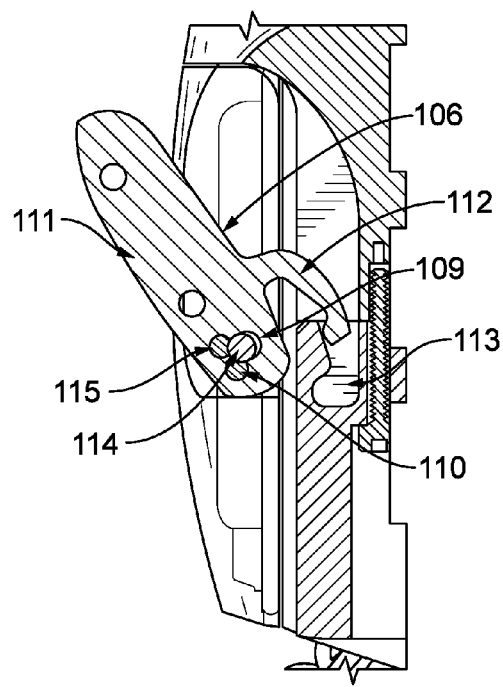
FIG. 4A is a cross-sectional elevation view of the electronic device of FIG. 1, showing the latch assembly in the unlocked position.
Figure 4B:
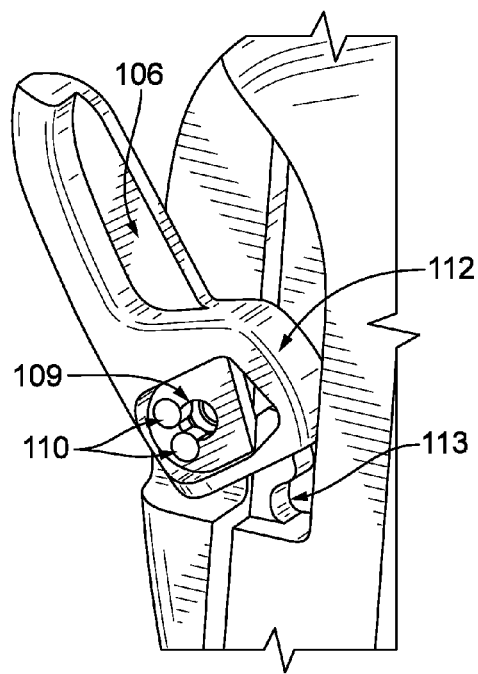
FIG. 4B is a perspective view of the latch assembly of FIG. 4A, showing the hinge pin removed.

FIGS. 4A and 4B show the modified latch opening using a latch assembly according to an embodiment herein. The latch assembly 106 includes an elongated latch body/latch member 111 operatively connected to an arm portion (e.g., hook) 112. The latch member 111 may include a slotted hinge hole/bore 109 through which a hinge pin 114 may be inserted. The latch member 111 may be configured to pivot about the hinge pin 114. The arm portion 112 may be configured to slidably engage a groove 113 on the electronic device to change the user access door between an open position and a closed position. The arm portion 112 can be disengaged from the groove 113 in the open position, and the arm portion 112 can be engaged with the groove 113 in the closed position.

The latch member 111 includes two apertures 115 through which resilient members 110 may be seated. The resilient members 110 are arranged such that they are abutting the bore 109, i.e., resilient members 110 form part of the bore surface that can engage the hinge pin 114. In certain embodiments, the resilient members 110 may be polymer inserts that match the overall compression of the o-ring 105. Selection of the material for the resilient members 110 depend on application. For example, if a higher degree of o-ring compression is desired, the resilient members 110 can be made from stiffer materials.

When the latch assembly 106 is in the locked position, both the o-ring 105 and polymer inserts 110 can deflect. This deflection accommodates lateral movement of the hinge pin in the bore and allows for a degree of movement of the latch assembly 106 and the door assembly 200, which in turn creates a more consistent user feel. It also allows the polymer insert 110 to deflect when the latch assembly 106 is locked. As such, in the locked position, the polymer inserts 110 relieve the overall compression on the compressible sealing member of the closed user access door, thereby preventing the user from over-compressing the o-ring 105 and affecting its reliability/durability.

Advantageously, with the addition of the polymer inserts 110, the tolerance of the mechanical assembly/parts can be designed to be relaxed relative to the traditional assemblies. Normally, the latch assembly may not close if the door is tight as the latch rotates about a single fixed pin. Using a latch assembly which includes the polymer inserts described herein, the latch can move back and forth laterally and the amount of movement may be controlled by design, e.g., by changing the diameter and/or material of the polymer insert.

The methods and systems of the present disclosure, as described above and shown in the drawings, provide for electronic devices having a latch assembly to provide an improved seal of the user access compartments. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An electronic device sealing arrangement, comprising:
a housing;
an access door;
a sealing member sized and configured to be compressed between the access door and the housing;
a latch with a bore in operable communication with the housing and the access door, the latch being configured to compress the sealing member between the access door and the housing when moved to a position that latches the access door in a closed position; and
a resilient member in operable communication with the latch and at least one of the housing and the access door, the resilient member being configured to at least partially compress when the access door is latched in the closed position and the sealing member is compressed between the access door and the housing
wherein the resilient member includes a pair of resilient members abutting the bore,
wherein the pair of resilient members includes a pair of polymeric inserts configured to deflect laterally upon closing of the latch.

2. The electronic device of claim 1, wherein the sealing member forms a face seal between a surface on an access area and the access door upon closing of the access door.

3. The electronic device of claim 1, wherein deflection of at least one of the pair of resilient members increases an amount of allowable lateral movement of the latch.

4. The electronic device of claim 1, wherein an access area includes one of a battery compartment, a memory access compartment and an input/output compartment.

5. The electronic device of claim 1, wherein the electronic device includes a camera.

6. The electronic device of claim 1, wherein:
the bore is configured for receiving a hinge pin, the latch being configured to pivot about the hinge pin;
the resilient member is configured adjacent to the bore to accommodate lateral movement of the hinge pin in the bore;

the latch includes an arm portion configured to slidably engage a groove on the electronic device to toggle the user access door between a locked position and an unlocked position; and the resilient member, in the locked position, relieves the overall compression on the sealing member of the user access door in a closed position.

7. The electronic device of claim 6, wherein the arm portion is disengaged from the groove in the unlocked position.

8. The electronic device of claim 6, wherein the arm portion is engaged with the groove in the locked position.

9. The electronic device of claim 1, wherein at least one of the pair of resilient members includes a compressible material.

10. The electronic device of claim 9, wherein at least one of the pair of resilient member includes a polymeric insert.

11. The electronic device of claim 10, wherein the polymeric insert is selected to match an overall compression of the sealing member.

12. The electronic device of claim 10, wherein compressibility of the polymeric insert is inversely related to compressibility of the sealing member.

13. A latch assembly, comprising:
a latch in operable communication with a housing and an access door of an electronic device, the latch being configured to compress the sealing member between the access door and the housing when moved to a position that latches the access door in a closed position; and a resilient member in operable communication with the latch and at least one of the housing and the access door, the resilient member being configured to at least partially compress when the access door is latched in the closed position and the sealing member is compressed between the access door and the housing, wherein the resilient member includes a pair of resilient members abutting the bore, wherein the pair of resilient members includes a pair of polymeric inserts configured to deflect laterally upon closing of the latch.

14. The latch assembly of claim 13, wherein the latch includes a bore configured for receiving a hinge pin, the latch being configured to pivot about the hinge pin, and the resilient member being configured to be adjacent to the bore to accommodate lateral movement of the hinge pin in the bore.

15. The latch assembly of claim 13, wherein the resilient member is configured to deflect laterally upon closing of the latch.

16. A method of sealing an electronic device, comprising:
rotating an access door about a pivot defined in a housing;
moving a latch relative to the access door and the housing;
compressing a sealing member between the access door and the housing; and
compressing a pair of resilient members between the latch and at least one of the access door and the housing, wherein compressing the resilient member includes deflecting laterally a pair of polymeric inserts included in the pair of resilient members upon moving the latch.

* * * * *